June 11, 1968 L. F. KUTIK Re. 26,403

PLASTIC BRISTLE BRUSH

Original Filed March 17, 1964 3 Sheets-Sheet 1

INVENTOR.
LOUIS F. KUTIK
BY James N. Cyles
ATTORNEY

INVENTOR.
LOUIS F. KUTIK
BY James N. Gee
ATTORNEY

PLASTIC BRISTLE BRUSH

Original Filed March 17, 1964 3 Sheets-Sheet 3

INVENTOR.
LOUIS F. KUTIK
BY
James N. Cyles
ATTORNEY

United States Patent Office

Re. 26,403
Reissued June 11, 1968

26,403
PLASTIC BRISTLE BRUSH

Louis F. Kutik, Fort Lauderdale, Fla., assignor of fifty percent to Erich W. Gronemeyer, Fort Lauderdale, Fla.

Original No. 3,214,777, dated Nov. 2, 1965, Ser. No. 352,689, Mar. 17, 1964. Application for reissue Aug. 29, 1966, Ser. No. 582,181
3 Claims. (Cl. 15—187)

Matter enclosed in heavy brackets [ ] appears in the original patent but forms no part of this reissue specification; matter printed in italics indicates the additions made by reissue.

*ABSTRACT OF THE DISCLOSURE*

*This invention proposes a plastic brush having a body portion and a plurality of bristles integrally formed therewith. The bristles are of specific shape, being rectangular in cross-sectional shape and tapering from the body portion to a reduced tip. The bristles are made in a multi-part mold having cooperating bristle cavity-defining portions so that any inherent flash formed during molding results in the presence of fins at each bristle corner and at the bristle tip to provide an improved scrubbing action.*

Figure 1:
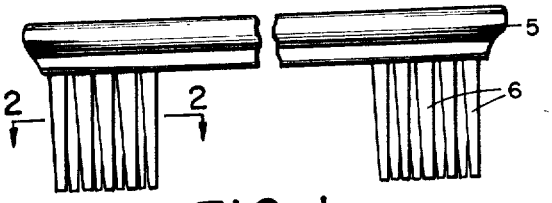

This invention relates to improved molded plastic brushes having a head portion and a plurality of bristles integral with the head portion.

The forming of a brush having a backing or head portion and integral bristles are broadly known in the art. This invention contemplates the forming of a bristle brush in a novel manner and whereby the bristles are rectangular in cross section and the bristles of each adjacent row being staggered with respect to the other bristles and whereby the bristles have flat sides and relatively thin edges, permitting a free flexing of the bristles transversely while the flexing of the bristles longitudinally are retarded due to the cross sectional shape of the bristles, such being particularly desirable in toothbrushes where the rows of the bristles are up and down with respect to the teeth and gives a soft yielding motion to the bristles when applied to a toothbrush. Further it is most desirable that the bristles be relatively soft and yieldable in one direction, such as the up and down motion of the brush when brushing the teeth and yield and conform to the contour of the teeth.

Novel features of construction and operation of the device will be more clearly apparent during the course of the following description, reference being had to the accompanying drawings wherein has been illustrated the preferred form of the device and wherein like characters of reference are employed to denote like parts throughout the several figures.

Figure 2:
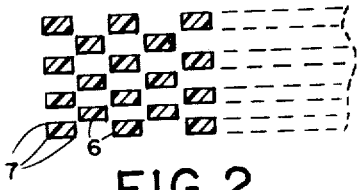
Figure 3:
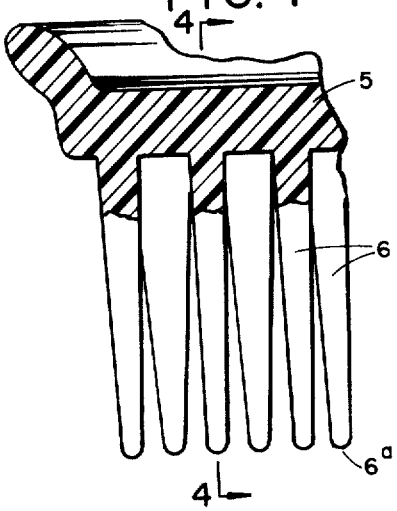
Figure 4:
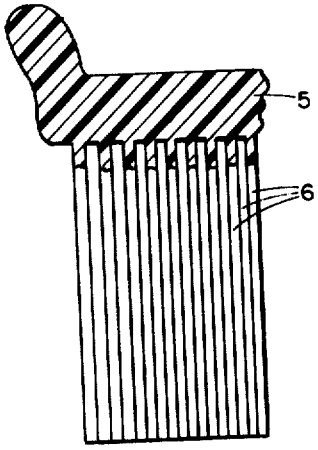
Figure 5:
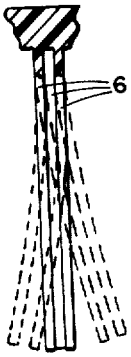
Figure 6:
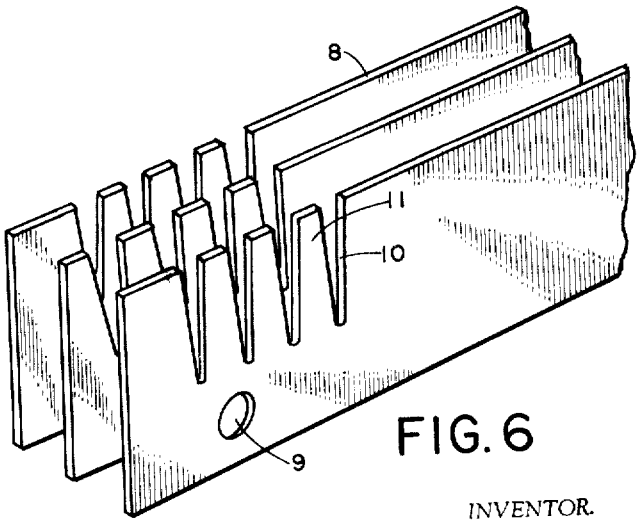
Figure 7:
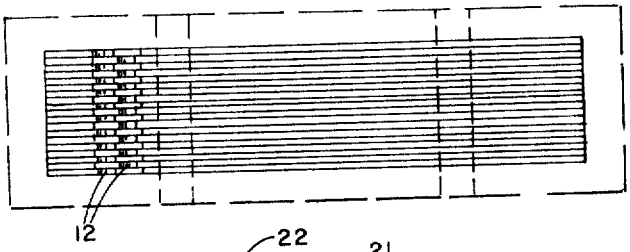
Figure 8:
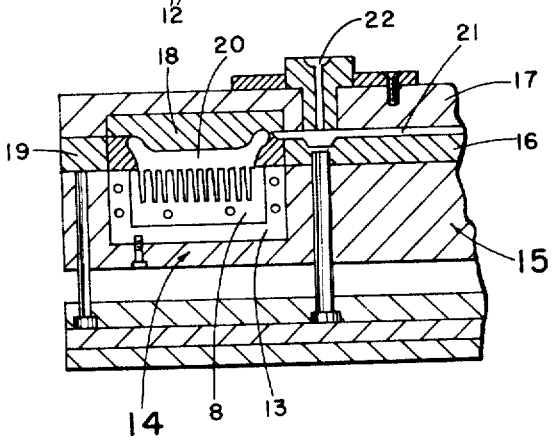
Figure 9:
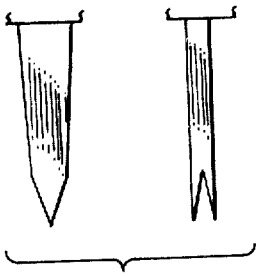
Figure 10:
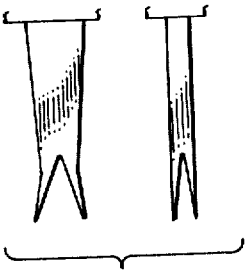
Figure 11:
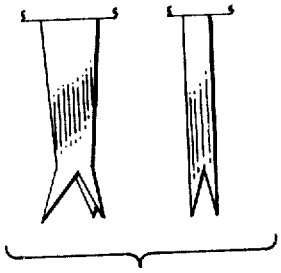
Figure 12:
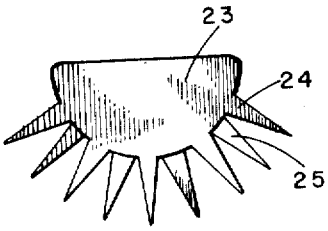
Figure 13:
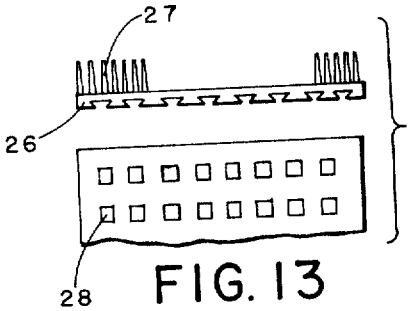
Figure 14:
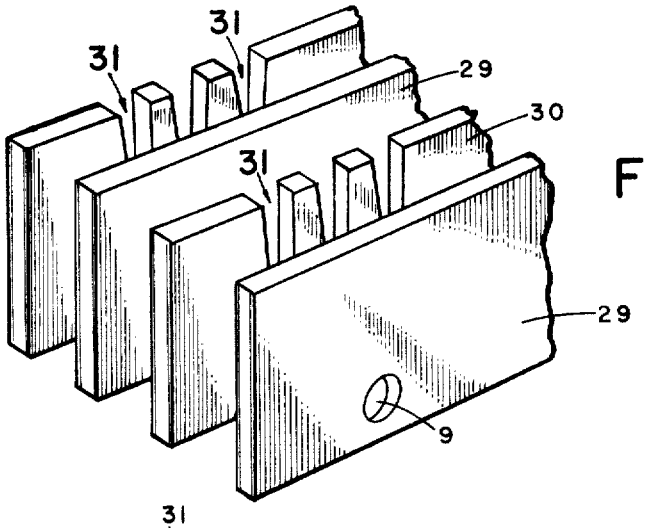
Figure 15:
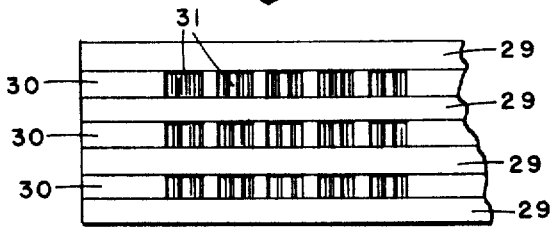
Figure 16:
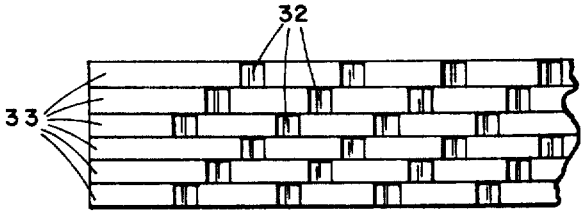
Figure 17:
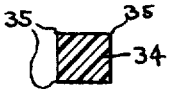

In the drawings:

FIGURE 1 is a fragmentary view of a brush constructed in accordance with the invention, FIGURE 2 is a greatly enlarged horizontal section taken on line 2—2 of FIGURE 1 and illustrating a group of bristles, FIGURE 3 is a fragmentary longitudinal section, parts in elevation and illustrating the brush head and the integral bristles, FIGURE 4 is a transverse vertical section taken substantially on line 4—4 of FIGURE 3, FIGURE 5 is a transverse fragmentary section illustrating the flexibility of the bristles laterally of the head portion, FIGURE 6 is a fragmentary perspective view illustrating the mold forming laminations, FIGURE 7 is a plan view illustrating the several laminations for the mold and with the laminations being bolted together for disposition within a cavity, FIGURE 8 is a vertical sectional view of a mold for receiving the cavity of this invention, FIGURE 9 is a side and edge elevational view of a modified design of bristle, FIGURE 10 is a side and edge elevation of a further modified form of bristle, FIGURE 11 is a side and edge elevation of a further modified form of bristle, FIGURE 12 is a further modified form of mold lamination for forming an arcuate brush, FIGURE 13 is a fragmentary side elevation and a bottom plan view of a molded device for forming flooring tile, FIGURE 14 is a perspective view of a group of laminations showing a modified form of cavity forming mold, FIGURE 15 is a fragmentary plan view of the mold forming laminations of FIGURE 14, FIGURE 16 is a further modified form of an arrangement of stamped laminations forming bristles in staggered or stepped relation, and FIGURE 17 is a cross section through a modified form of bristle.

Referring specifically to the drawings and particularly to FIGURES 1–5 inclusive, there has been provided a head portion 5, having bristles 6 formed integral therewith. As will be observed, the bristles, shown particularly in FIGURE 2 are rectangular in cross section having four sharp edges 7 that perform a scraping action and the bristles of each alternate row, shown at 6' in FIGURE 2 overlap the space between adjacent rows of bristles. As shown in FIGURE 5, the rectangular shape of the bristle permits of relatively soft lateral or bending motion to the bristles, such as is desirable in toothbrushes, where the brush is moved in a vertical path over the teeth and creates a relatively soft flexible action calculated to impart a massaging action upon the gums. The bristles may terminate at their ends in any particular design, such as being rounded at 6a, shown in FIGURE 3 or the bristles may be shaped as illustrated in either FIGURES 9, 10 or 11.

The molds (see particularly FIGURES 6 and 7) embody a plurality of very thin laminations 8 and with the laminations being of identical length and apertured at 9 to receive bolts or the like whereby the laminations are tightly engaged with each other for dispositions within a mold device of the character shown in FIGURE 8. Each of the laminations 8 are slotted throughout their thickness as indicated at 10 and the slots 10 may be of tapered design or either of the designs of FIGURES 9, 10 and 11. The slots 10 are staggered with respect to each adjacent lamination and with the material of the lamination between each slot, indicated at 11 having overlapping relation with respect to the slots of adjacent laminations and when assembled, as shown in FIGURE 7 form a plurality of cavities 12, throughout the length of the mold and with the cavities being upwardly opening for the reception of fluent plastic that fills the cavities and simultaneously forms the head 5 for the brush and the shape of the resultant bristles will obviously conform to the particular shape of the slots 10. The design of the slot 10 will permit the ready disengagement of the bristles from the mold since the cavities are so shaped that the bristles can be readily pulled away from the mold. The several laminations 8 are formed by stamping the lamination and each lamination is arranged so that each alternate lamination has its slots in staggered relation to adjacent laminations and whereby to form the cavities 12 and after stamping, the laminations are polished to remove any burrs on the metal that would prevent the easy withdrawal of the bristles and to cause the bristles to be accurately formed in rectangular shape for their major length, having the sharp edges 7. With the group of laminations tightly bolted together and with the slots 10 in staggered relation in each alternate lamination, the bristle form cavities formed by the group of laminations is inserted within a mold 13 in which the group of laminations are mounted and the cavities 12 are installed within a reset 14 of a movable mold section 15 of conventional construction. The mold section 15 carries a stripper plate 16 and a bolster plate 17 for holding the elements 18 and 19, that are recessed at 20, in accordance with the shape of the head portion 5. The plates 16 and 17 are grooved to form runners 21 receiving fluent plastic from a sprue 22 to flow in opposite directions and into the cavity 12 and simultaneously forming the head 5 for the brush. The mold apparatus may be of any desirable configuration but here has been illustrated as one desirable manner of mounting the group of laminations for receiving the plastic and to also form the integral head 5.

The several shapes of bristles illustrated in FIGURES 9, 10, and 11 are only certain variations of bristles that can be formed with a device of this nature. The forked bristles may be formed in any desirable manner as by filling or cutting away certain area of the bottoms of the slots 10 in each lamination and while the bristles here shown indicate forks and other designs, they are within the confines of the cavity formed by the slots 10.

*The bristles each are formed between three cooperating mold elements i.e. the bristles formed in the slots 10 of one lamination has its opposing side surfaces defined by the non-slotted portions of the adjacent laminations 8. The inherent flash formed during the injection molding operation between the abutting laminations 8 will inherently provide a minute longitudinal fin at each corner of the bristle and these fins at the corners will merge at the bristle tip into edges which completely circumscribe the tip.*

It will be apparent from the foregoing that a very novel method has been provided to form a mold for a multiplicity of rectangular bristles and with the bristles having four sharp corners calculated to provide a scraping action over an area to be cleaned. The mold forming laminations 8 are economically formed by stamping of sheet metal of a thickness calculated to determine the transverse thickness of the bristles to be formed and the mold formed by the laminations 8 is cheap to manufacture and assembled with a minimum of effort into a compact mold for subsequent disposition into a molding machine. It should be pointed out, that the slots 10 are stamped entirely through the laminations 8 and then polished on opposite sides to remove any undercut portions of metal that might adhere to the edges of the slots and restrict the easy removal of bristle. The polishing also permits the several laminations to be bolted together tightly and forming the multiplicity of cavities 12.

In FIGURE 12, there has been illustrated an arcuate brush forming lamination 23 for forming bristles 24 and alternate staggered bristles 25. This form of the invention is particularly useful in molding brushes of the type generally employed as hair brushes.

Now, referring to FIGURE 13, there has been provided a structure similar to that previously described and here illustrating a backing sheet 26, carrying the bristles 27. The backing sheet is provided with a plurality of dovetail integral recesses 28 for the reception of knock-out pins employed in the mold structure. The structure of FIGURE 13 is primarily for use in the manufacture of floor tile or the like and usually is square in top plan view and of any desirable dimension. While the device of FIGURE 13 has been illustrated as a floor tile, it is obvious that the particular construction might also be employed with respect to carpeting having indeterminate length. The bristles 27 may be as illustrated in FIGS. 9, 10 and 11 and having flat parallel sides and with the edges being tapered upwardly from the backing sheet 26 in various configurations.

Referring now to FIGURES 14 and 15, there has been illustrated a modified form of mold forming laminations wherein each of the molds have laminations of identical dimensions. The outermost lamination in each mold is formed of a plain or imperforate plate 29 and each alternate plate 29 receives therebetween a stamper mold plate 30, forming the cavities 31. Actually the mold plates 30 are substantially identical to the plates 8 of the first form of the invention but here, the imperforate plates 29 form a closure for the cavities 31 upon each side of the plates 30.

In FIGURE 16 there has been illustrated a further modified form of mold device forming the cavities 32. Here, the several plates 33 have the slots 10 stamped therethrough and with the plate subsequently to be assembled as a cavity formed mold by disposing each group of plates, being three in number so that the plates are disposed in position as a mold with the cavities in staggered or stepped relation. The operation of the forms of the invention in FIGURES 14–16 as far as the molding is concerned is substantially identical to the form of the bristles as illustrated in the first form of the invention.

In FIGURE 17, there has been illustrated a modified form of bristles 34 but here, the bristle is formed substantially square in cross-section and with the usual taper downwardly from the head sufficient to permit the bristle to be withdrawn from its cavity. This bristle also embodies the four strap corners 35, similar to the other forms of the invention.

It is to be understood that the invention is not limited to the precise construction shown, but that changes are contemplated as readily fall within the spirt of the invention as shall be determined by the scope of the subjoined claims.

I claim:

1. A brush composed of a plastic material and having a head and a plurality of rows of bristles integrally formed with the head and projecting from it, each bristle decreasing in width in one direction from its connection to the head to its free end, and each bristle being of uniform thickness for its entire length, the bristles being substantially rectangular in cross-sectional shape and with their shapes causing them to be resistant to flexure axially of the head and having greater flexibility transversely of the head, the shape of the bristles providing each of them with four sharp corner edges, and the bristles in one row being located in staggered relation to those in an adjacent row.

2. A brush according to claim 1, wherein the bristles are rounded at their extremities, and the bristles in one row are in alignment transversely of the head with the spaces that exist between the bristles in an adjoining row.

*3. An injection molded brush composed of plastic material and having a body portion and a plurality of bristles integrally formed with said body portion to project thereon, said bristles each being rectangular in cross-sectional shape and tapering from said body portion to a reduced tip, each bristle having four sharp corners*

*throughout substantially its entire length, which corners merge at the bristle tip into edges which completely circumscribe the tip, the bristle corners and the tip edges each having a minute longitudinal fin coextensive therewith and projecting therefrom.*

References Cited

The following references, cited by the Examiner, are of record in the patented file of this patent or the original patent.

UNITED STATES PATENTS

| | | | |
|---|---|---|---|
| 3,312,583 | 4/1967 | Rochlis | 161—62 |
| 848,973 | 4/1907 | Crittenden | 15—188 |
| 1,764,130 | 6/1930 | Vardeman. | |
| 3,125,776 | 3/1964 | Lilley | 15—159.1 |
| 2,041,262 | 5/1936 | Ness | 15—188 |
| 3,128,488 | 4/1964 | Schad | 15—187 |

| | | | |
|---|---|---|---|
| 1,948,826 | 2/1934 | Peterson | 15—215 |
| 2,349,977 | 5/1944 | Mazzoni | 18—42 |
| 2,548,255 | 4/1951 | Cressler | 15—159.1 |
| 2,783,490 | 3/1957 | Kutik | 15—187 |
| 2,783,501 | 3/1957 | Kutik | 18—42 |
| 3,004,291 | 10/1961 | Schad | 18—42 |
| 3,100,312 | 8/1963 | Williams | 15—215 |

FOREIGN PATENTS

| | | |
|---|---|---|
| 241,683 | 11/1962 | Canada. |
| 950,461 | 10/1956 | Germany. |
| 185,943 | 9/1922 | Great Britain. |
| 897,404 | 5/1962 | Great Britain. |
| 203,802 | 6/1939 | Switzerland. |

CHARLES A. WILLMUTH, *Primary Examiner.*

PETER FELDMAN, *Examiner.*